United States Patent [19]
Bennett et al.

[11] 3,988,297
[45] Oct. 26, 1976

[54] PROCESS FOR THE PREPARATION OF POLYPHENYLENE ETHERS WITH ACTIVATED COPPER-AMINE CATALYSTS

[75] Inventors: James G. Bennett; Glenn D. Cooper, both of Delmar, N.Y.

[73] Assignee: General Electric, Pittsfield, Mass.

[22] Filed: July 3, 1974

[21] Appl. No.: 485,741

[52] U.S. Cl. ............................................. 260/47 ET
[51] Int. Cl.² ................... C08G 67/00; C08G 65/42
[58] Field of Search ................................ 260/47 ET

[56] References Cited
UNITED STATES PATENTS

| | | | |
|---|---|---|---|
| 3,365,422 | 1/1968 | Van Dort | 260/47 ET |
| 3,549,670 | 12/1970 | Spousta et al. | 260/47 ET |
| 3,733,299 | 5/1973 | Cooper et al. | 260/47 ET |
| 3,787,358 | 1/1974 | Nishioka et al. | 260/47 ET |

*Primary Examiner*—Lucille M. Phynes
*Attorney, Agent, or Firm*—William F. Mufatti; Edward A. Hedman

[57] ABSTRACT

There is disclosed herein an improved process for the preparation of high molecular weight polyphenylene ethers by oxidatively coupling a di-ortho substituted phenolic precursor in a reaction vessel containing oxygen and a complex catalyst formed from a copper salt and either a primary, secondary or tertiary amine wherein in the presence of an aqueous phase a quaternary ammonium salt is employed to promote the rate of reaction.

25 Claims, No Drawings

PROCESS FOR THE PREPARATION OF POLYPHENYLENE ETHERS WITH ACTIVATED COPPER-AMINE CATALYSTS

The present invention relates to a process for the preparation of high molecular weight polyphenylene ethers by oxidatively coupling a di-ortho substituted phenolic precursor in a reaction vessel containing a complex catalyst formed from a copper salt and a primary, secondary or tertiary amine in the presence of an aqueous phase wherein a quaternary ammonium salt is employed to promote the rate of reaction.

BACKGROUND OF THE INVENTION

The polyphenylene ethers and processes for their preparation are known in the art and described in numerous publications, including Hay, U.S. Pat. Nos. 3,306,874 and 3,306,875. Other procedures are described in the Bennett and Cooper patents, U.S. Pat. Nos. 3,639,656, 3,642,699, 3,733,299 and 3,661,848. All of these patents are incorporated herein by reference.

The processes most generally used to produce the polyphenylene ethers are based on the self-condensation of a monovalent phenol in the presence of an oxygen-containing gas and a catalyst. Inorganic bromides have been described as promoters for this reaction in the above-noted U.S. Pat. Nos. 3,733,299, and onium compounds have been mentioned in U.S. Pat. Nos. 3,365,422 as promoters for this reaction in the absence of free water.

It has now been found that the use of a critical maximum amount of a quaternary ammonium salt will reduce the amount of time required to produce a polymer having a commercially useful molecular weight over the time required to produce the same molecular weight polymer, if this material is not employed in the catalyst system, provided that an aqueous phase is present in the reaction zone. This is accomplished by the use of less than the disclosed amount of onium compound that is used in U.S. Pat. No. 3,365,422 and without the water-free conditions that are taught by that reference.

U.S. Pat. Nos. 3,549,670 relates to the oxidation of phenols with a metallic copper-nitrogen base catalyst in a particular solvent system. High concentrations of the nitrogen base materials are used in the disclosed reaction and these materials do not act as reaction promoters.

It has been found that for a given quantity of copper-salt amine catalyst, the combination of an alkali metal bromide or alkaline earth metal bromide and a quaternary ammonium salt will produce a polymer of higher molecular weight that it is possible to produce with the use of a single promoter irrespective of the length of time the reaction is run.

It has also been found that the total amount of copper-salt amine catalyst may be reduced in connection with the oxidative coupling of di-ortho-substituted phenols when a combination of an alkali metal bromide or alkaline earth metal bromide and an ammonium salt are employed as promoters for said copper-salt amine catalyst system.

These and other advantages of this invention will be apparent from a reading of the detailed description of the invention.

DESCRIPTION OF THE INVENTION

According to the present invention, in a process for forming a high-molecular polyphenylene ether having a degree of polymerization of at least 50 by oxidatively coupling a monovalent phenol having substitution in at least the two ortho positions and hydrogen or halogen in the para-position, using an oxygen-containing gas and an copper-salt amine catalyst as an oxidizing agent in the presence of an aqueous phase, there is provided as a reaction promoter a quaternary ammonium salt of the formula:

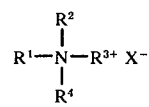

wherein $R^1$, $R^2$, $R^3$ and $R^4$ are alkyl, aralkyl and alkenyl groups of from 1–24 carbon atoms and $X^-$ is an anion. The preferred anions are halides such as bromine or chlorine, or sulfate or phosphate. Mixtures of the ammonium salts may also be employed and the total number of carbon atoms in the $R^1$, $R^2$, $R^3$ and $R^4$ substituents should be at least 10. The quaternary ammonium salts may be employed at a range of from 0.005 to 0.2 mole percent based on the monovalent phenol. The preferred range is from 0.01 to 0.08 mole percent based on the monovalent phenol. High concentrations of this material will interfere with the oxidative coupling of the phenolic compound in the presence of an aqueous phase. For example, 1.2 mole percent of methyltrioctylammonium chloride has been shown to be capable of preventing the formation of high polymer, i.e. poly(2,6-dimethyl-1,4-phenylene) ether having an intrinsic viscosity in $CHCl_3$ at 30° C. of about 0.50.

A curprous or cupric copper salt and a primary, secondary, or tertiary amine may be employed as a complex catalyst in combination with an quaternary ammonium salt, said quaternary ammonium salt being present in the catalyst in an amount at least sufficient to increase the rate of oxidative coupling.

In addition, an alkali metal bromide or alkaline earth metal bromide may be employed in conjunction with the ammonium salt.

The alkali metal bromide or alkaline earth metal bromides may be used at a range of 0.1 mole to 150 moles per 100 moles of phenolic compound. It is preferred to employ from about 0.1 to 5 moles per 100 moles of phenolic component of the alkalimetal bromide or the alkaline earth metal bromide.

The nature of the alkali metal bromide or alkaline earth metal bromide promoter is not particularly critical. Illustrative members of the promoter family are lithium bromide, sodium bromide, potassium bromide, rubidium bromide, cesium bromide, magnesium bromide, calcium bromide, strontium bromide and barium bromide. Preferred bromides are sodium bromide, potassium bromide, lithium bromide, cesium bromide and magnesium bromide. They can be used alone or in admixture. They can also be used in anhydrous or hydrated form.

With respect to the copper salt, while not critical, the bromide promoter is preferred to be present in an amount of from about 0.5 to about 25 moles per mole of copper salt and, especially preferably, from about 1 to about 10 moles per mole of copper salt.

The quaternary ammonium salts are well known and many are commercially available. The alkyl substituents may be methyl, ethyl, propyl, butyl, hexyl, octyl, decyl, cetyl, hexadecyl and isomers thereof. Mixtures of these compounds may also be employed. The aralkyl substituent may include alkyl-mono-carbocyclic radicals having from 7 to 20 carbon atoms such as benzyl, phenethyl and the like. The alkenyl substituents include straight and branched chain unsaturated hydrocarbon atoms of from 1–24 carbon atoms which contain one or more double bonds such as 2-pentenyl, 3,6-ditetradecenyl, 3-hexadecenyl, 6-eicosenyl, 8-heineicosenyl, 6-tricosenyl and the like.

The quaternary ammonium salts are well known and many are commercially available. For example, reference may be made to Kirk-Othmer Encyl. of Chemical Technology, second edition, Volume 16, pp. 859–865; Arquads, Armour Industrial Co. (1956) and Schwartz, A. M. et al, Surface Active Agents, Vol. 1, pp. 156–171 and Interscience Publishers (1949) and Vol. II, pp. 112–118 (1958), all of which are incorporated by reference. A particularly useful compound is methyl-tri-n-octylammonium chloride.

The promoters are all readily available or can be prepared in known ways. Although it is not at all essential, the promoters are all conveniently included in the catalyst by stirring the copper salt, the bromide and the ammonium salt in a small amount of an alcohol, e.g., methanol, and then adding the mixture of the amine dissolved in an aliquot of the reaction solvent. This gives an intimate mixture which can be conveniently handled. The use of an alcohol is not essential, however, as active catalysts can be obtained from the same copper salt, bromide and ammonium salt without alcohol. Alternately, the ammonium salt may be added directly to the solvent.

The reaction may be run at a concentration of from 5 to about 50 percent solids (monomer). Preferably, it is desirable to run at a high solids level and the preferred range is from about 15 to 35 percent solids.

The improved process of this invention is broadly applicable to all of the phenols disclosed in the above-mentioned Hay patents. Illustrative of such preferred phenols are 2,6-dimethylphenol, 2,6-diethylphenol, 2-methyl-6-ethylphenol, 2-methyl-6-allylphenol, 2-methyl-6-phenylphenol, 2,6-diphenylphenol, 2,6-dibutylphenol and 2-methyl-6-propylphenol. Especially preferred as a phenolic starting material is 2,6-dimethylphenol, also known as 2,6-xylenol.

The primary, secondary, or tertiary amine component of the catalyst complex corresponds to those disclosed in the above-mentioned Hay patents. Illustrative members include aliphatic amines, where the aliphatic group can be straight or branched chain hydrocarbon or cycloaliphatic. Preferred are aliphatic monoamines. Especially preferred are mono-, di- and tri-alkyl amines, the alkyl groups having from 1 to 12 carbon atoms. Typically, there can be used mono-, di- and tri-methyl, ethyl, n-propyl, i-propyl, n-butyl substituted amines, mono- and di-cyclohexylamine, ethylmethyl amine, morpholine, N-alkyl cycloaliphatic amines, such as N-methylcyclohexylamine. In addition, cyclic tertiary amines, such as pyridine, alphacollidine, gamma picoline, and the like, can be used.

Mixtures of such primary, secondary and tertiary amines may be used if desired. A preferred mono-alkyl amine is n-butyl amine; a preferred di-alkyl amine is di-n-butyl amine; and a preferred tri-alkyl amine is triethyl amine. A preferred cyclic tertiary amine is pyridine. The concentration of primary and secondary amine in the reaction mixture may vary within wide limits, but is desirably added in low concentrations. A preferred range comprises from about 2.0 to 25.0 moles per 100 moles of monovalent phenol. In the case of a tertiary amine, the preferred range is considerably higher, and comprises from about 500 to about 1,500 moles per 100 moles of monovalent phenol.

Typical examples of cuprous salts and cupric salts suitable for the process are shown in the Hay patents. These will include cuprous chloride, cuprous bromide, cuprous sulphate, cuprous azide, cuprous tetramine sulfate, cuprous acetate, cuprous butyrate, cuprous toluate, cupric chloride, cupric bromide, cupric sulfate, cupric azide, cupric tetramine sulfate, cupric acetate, cupric butyrate, cupric toluate, and the like. Preferred cuprous and cupric salts are the halides, alkanoates or sulfates, e.g., cuprous bromide and cuprous chloride, cupric bromide and cupric chloride, cupric fluoride and cupric acetate. With primary and secondary amines, the concentration of the copper salts is desirably maintained low and preferably varies from about 0.1 to 2.5 moles per 100 moles of monovalent phenol. With tertiary amines, the copper salt is preferably used in an amount providing from about 5 to about 15 moles per 100 moles of the monovalent phenol.

The polymerization reaction is preferably performed in a solvent. Suitable solvents are disclosed in the above-noted Hay patents. Aromatic solvents such as benzene, toluene, xylene and o-dichlorobenzene are especially preferred, although tetrachloromethane, trichloromethane, dichloromethane, 1,2-dichloroethane may also be used.

Other promoters such as diphenylguanidine may also be employed in combination with the bromide and/or tetraalkylammonium compound.

The process for forming the polymer and the reaction conditions, such as temperature, oxygen flow rate and the like are essentially the same as the conditions disclosed in the above-mentioned Hay patents, though reaction time to generate high molecular weight polymer is reduced. The above-noted concentration ranges are preferred, though these ranges may vary to some extent depending upon oxygen flow rate, reaction temperature and the like.

In a preferred manner of proceeding, a suitable reaction vessel is charged with the solvent, the copper salt mixed with the bromide promoter, the tetraalkylammonium compound and the amine. The mixture is stirred for a short time, sufficient to mix the ingredients, e.g., 5 minutes, then added to the reactor. Then the phenolic precursor is added and well mixed. Oxygen or an oxygen containing gas as air is next passed into the stirred mixture for the desired period, e.g., 120 minutes, and the reaction temperature is maintained at between 15° and 50° C., preferably at about 25°–40° C., cooling if necessary.

As the reaction is run it is observed that a separate aqueous phase is present. Polymerization may be terminated in a known way, e.g., by adding 50% aqueous acetic acid. The product is recovered in a known way, e.g., by separating the aqueous acid layer by centrifugation and adding a non-solvent for the polymer, e.g., methanol, to the organic layer until the polyphenylene ether has been substantially completely precipitated.

Other techniques of removing catalyst and isolating the polymer may be used. These methods include the use of complexing agents to separate the catalyst and the use of spray drying, steam precipitation and hot water crumbing techniques. Certain of these methods are described in U.S. Pat. applications Ser. Nos. 427,996; and 311,837 and U.S. Pat. No. 3,838,102 of Glenn D. Cooper and James G. Bennett, all of which are hereby incorporated by reference.

The polyphenylene ethers prepared by the process of this invention are useful for all the purposes disclosed in the above-mentioned Hay patents. For example, they can be used in molded articles or in films, tapes and the like. They may be mixed with other resins, or various fillers, reinforcements, dyes, pigments, stabilizers, plasticizers and the like.

DESCRIPTION OF THE PREFERRED EMBODIMENTS

The following examples illustrate the processes of this invention. They are merely illustrative and are not to be construed to limit the invention in any manner whatsoever.

EXAMPLE 1

Catalyst was prepared by stirring 0.25 g of cupric chloride and 0.39 g of sodium bromide in 4 ml of methanol, then transferring the mixture to a one-liter reactor containing 450 ml of toluene and 10.9 g of di-n-butyl amine (DBA). The mixture was stirred vigorously by means of a turbine stirrer and a stream of oxygen (1.5 cubic feet/hr) was introduced near the bottom of the flask. A solution of 70 g of 2,6-xylenol in 70 g of toluene was added by means of a pump over a period of 15 minutes; 50 ml of toluene was then added through the pump to wash out the delivery lines. The temperature was maintained at 30° C. by circulating water from a constant-temperature bath through an internal cooling coil. During the reaction, a separate aqueous phase was present at the bottom of the reactor. At intervals of 60, 90 and 120 minutes after the beginning of xylenol addition samples of the reaction were withdrawn and stirred with 50% aqueous acetic acid. The samples were centrifuged, the organic layer was decanted, and the polyphenylene ether was precipitated by the addition of methanol. The polymer was filtered off, washed with methanol, dried, and the intrinsic viscosity was determined in chloroform at 30° C.

EXAMPLES 2–7

Examples 2–7 were carried out in the same way as Example 1, except that varying amounts of methyltri-n-octylammonium chloride was dissolved in the toluene solvent. Results are listed in Table 1.

TABLE 1

Effect of Methyltrioctylammonium Chloride on Polymerization Rate(a)

| Ammonium Salt(b) mole % of xylenol | I. V. (dl/g) 60 min. | 90 min. | 120 min. | Time to 0.50 dl/g (min.) |
|---|---|---|---|---|
| 1* none | .25 | .44 | .55 | 105 |
| 2* 1.2 | no polymer | — | .12 | — |
| 3 0.16 | .27 | .58 | .72 | 75 |
| 4 0.08 | .27 | .52 | .67 | 86 |
| 5 0.04 | .26 | .51 | .68 | 88 |
| 6 0.02 | .29 | .51 | .62 | 87 |
| 7* 2.0 | — | — | no polymer | |

*control
(a)Molar ratio xylenol: CuCl$_2$:NaBr:dibutylamine = 300:1:2:45
(b)Methyltri-n-octylammonium chloride

EXAMPLE 8

This was carried out as described in Example 1, except that no methanol was used; the solid cupric chloride and sodium bromide were added to the toluene and amine in the reactor. The intrinsic viscosity of polymer obtained after 90 minutes was 0.43 dl/g. When the same reaction was carried out with 0.16 mole percent methyltrioctylammonium chloride based on xylenol in the solvent, the intrinsic viscosity was 0.51 dl/g after 90 minutes.

EXAMPLE 9

This was carried out as described in Example 1, except that the solvent contained 0.07 mole percent (based on xylenol) of dodecyltrimethylammonium bromide. The intrinsic viscosity of the polymer was 0.55 dl/g after 90 minutes, compared to 0.44 dl/g when the polymerization was carried out with no ammonium salt present.

EXAMPLE 10

This was carried out as in Example 1, using 0.25 g of cupric chloride as the catalyst, but without the addition of sodium bromide. When the reaction was carried out without the addition of a tetraalkylammonium salt the intrinsic viscosity of the polymer after 120 minutes was 0.32 dl/g; with methyltrioctylammonium chloride in an amount equal to 0.16 mole percent of the xylenol the intrinsic viscosity was 0.48 dl/g after the same reaction time.

EXAMPLE 11

This was carried out in the same way as Example 1, except that 0.41 g of cupric bromide was used as the catalyst in place of the mixture of cupric chloride and sodium bromide. With no ammonium salt added 96 minutes was required to reach an intrinsic viscosity of 0.50 dl/g. When methyltrioctylammonium chloride (0.04 mole percent of the xylenol) was added to the catalyst solution a intrinsic viscosity of 0.50 dl/g was reached in 81 minutes.

EXAMPLE 12

This was carried out as described in Example 1, except that the cupric chloride was replaced by .19 g of cuprous chloride. The intrinsic viscosity of the polymer after 120 minutes was 0.38 dl/g. Under the same conditions, but in the presence of methyltrioctylammonium chloride in an amount corresponding to 0.16 mole percent of the xylenol, the intrinsic viscosity was 0.47 dl/g.

EXAMPLES 13–17

These examples were carried out following the procedure of Example 1, using the same amount of xylenol and solvent, but varying the amounts of dibutylamine, cupric chloride, sodium bromide, and methyltrioctylammonium chloride. The results are listed in Table 2.

TABLE 2

| No. | Catalyst Ratio xylenol: CuCl$_2$:NaBr:DBA | Methyltrioctylammonium Chloride mole % | I. V. 60 min. | I. V. 90 min. | I. V. 120 min. |
| --- | --- | --- | --- | --- | --- |
| 13* | 300:1:2:22.5 | 0 | .17 | .32 | .39 |
| 14 | 300:1:2:22.5 | 0.08 | .13 | .37 | .48 |
| 15 | 300:1:2:30 | 0.08 | — | .46 | .55 |
| 16* | 450:1:2:67.5 | 0 | — | .21 | .39 |
| 17 | 450:1:2:67.5 | 0.08 | — | .22 | .45 |

*control

EXAMPLE 18

This was carried out following the procedure described in Example 1. The concentration of xylenol was increased to 17 wt. % of the reaction mixture, and the amine used was a mixture of diamylamines largely composed of di-2-methylbutylamine and n-amyl-2-methylbutylamine; the molar ratio of xylenol: CuCl$_2$: NaBr: amine was 250:1:2:45. The intrinsic viscosity of the polymer after 120 minutes was 0.52 dl/g. In another polymerization carried out with the same amine, at a lower catalyst concentration (300:1:2:45) with 0.05 mole percent (based on xylenol) of methyltrioctylammonium chloride in the solvent, the intrinsic viscosity was 0.64 dl/g after 120 minutes.

EXAMPLES 19–21

Examples 19–21 illustrate the combined effect of tetraalkylammonium salts and diphenylguanidine on the polymerization rate. They were carried out at a xylenol concentration of 17 wt. % at a molar ratio of xylenol:CuCl$_2$:NaBr:dibutylamine of 200:1:12. The results are listed in Table 3.

TABLE 3

Polymerization Rates, 17 % Solids in Toluene(a)

| | Diphenylguanidine(b) | Ammonium Salts(c) | I.V. (90 min) |
| --- | --- | --- | --- |
| 19 | — | — | .45 |
| 20 | 0.5 | — | .54 |
| 21 | 0.5 | 0.05 | .60 |

(a)Molar ratio xylenol:CuCl$_2$:NaBr: dibutylamine = 200:1:2:12
(b)moles/mole of copper salt
(c)mole % methyltrioctylammonium chloride, based on xylenol.

EXAMPLES 22–29

The catalyst was prepared by dissolving the ammonium salt in 6 ml of methanol, then adding 0.585 g of sodium bromide and 0.375 g of cupric chloride. The mixture was stirred for five minutes and added to a solution of 16.35 g of dibutylamine in 50 ml of toluene, stirred briefly, and transferred to the oneliter reactor with 350 ml of toluene. Oxygen was introduced, with vigorous stirring, at a rate of 1.5 cu. ft./hr. A solution of 105 g of 2,6-xylenol in 105 g of toluene was added through a Milton-Roy pump over a period of 25 minutes; the monomer lines were then washed out by adding 50 ml of toluene through the pump. The oxygen flow rate was reduced to 0.5 cu. ft./hr. after the first 30 minutes of reaction. Reaction temperature was held at 30° for the first 60 minutes, then increased to 40° C. for the remainder of the reaction. A separate aqueous phase was present at the bottom of the reactor. The results are shown in Table 4.

TABLE 4

| No. | Catalyst Ratio (xylenol:CuCl$_2$: NaBr:DBA) | Ammonium Salt (Mole %) | Time of I.V. of 0.55 dl/g (min.) |
| --- | --- | --- | --- |
| 22 | 300:1:2:45 | 0 | 95 |
| 23 | " | 0.053$^a$ | 68 |
| 24 | " | 0.053$^a$ | 70 |
| 25 | " | 0.027$^a$ | 75 |
| 26 | " | 0.013$^a$ | 75 |
| 27 | " | 0.032$^b$ | 70 |
| 28 | " | 0.053$^c$ | 70 |
| 29 | " | 0.041$^d$ | 71 |

$^a$Aliquat 336 (largely methyltri-n-octylammonium chloride)
$^b$Onyx BTC-50 (mixture of n-alkyl benzyldimethyl ammonium chloride having n-alkyl groups with 50 % C$_{12}$, 30 % C$_{14}$, 17 % C$_{16}$, and 3 % C$_{18}$).
$^c$Arquad 2C-75 (mixture of dialkyl dimethyl ammonium chloride having 8 % octyl, 9 % decyl, 47 % dodecyl, 18 % tetradecyl, 8 % hexadecyl, 10 % octadecyl.)
$^d$Arquad 2HT75 (mixture of dialkyl dimethyl ammonium chlorides having 24 % of hexadecyl, 75 % octadecyl and about 1 % unsaturated octadecenyl).

EXAMPLE 30

This was carried out as described in Examples 22–29, except that the cupric chloride was replaced by 0.49 g of cupric sulfate monohydrate.

When no ammonium salt was added, 105 minutes was required to reach an intrinsic viscosity of 0.55 dl/g; the addition of 0.053 mole percent (based on xylenol) of methyltrioctylammonium chloride reduced the time required to reach the same intrinsic viscosity to 82 minutes.

Although the above examples have shown various modifications of the present invention, other variations are possible in light of the above teachings. It is, therefore, to be understood that changes may be made in the particular embodiments of the invention described which are within the full intended scope of the invention as defined by the appended claims.

We claim:

1. In a process for the preparation of a high molecular weight polyphenylene ether having a degree of polymerization of at least 50 by oxidatively coupling a monovalent phenol having substitution in at least the two ortho positions and hydrogen or halogen in the para-position, using an oxygen-containing gas and a complex catalyst comprising a copper salt and an amine as an oxidizing agent in the presence of a separate aqueous phase the improvement which comprises including in said complex catalyst an effective amount of an ammonium salt or a mixture of ammonium salts up to 0.2 mol percent, of the formula:

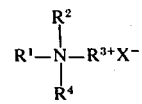

wherein $R^1$, $R^2$, $R^3$ and $R^4$ are selected from the group consisting of alkyl, alkenyl and aralkyl radicals of from 1–24 carbon atoms and $X^-$ is an anion.

2. A process as defined in claim 1 wherein $R^1$, $R^2$, $R^3$ and $R^4$ are alkyl.

3. A process as defined in claim 1 wherein the copper component of the catalyst is a cupric halide.

4. A process as defined in claim 1 wherein the copper component is a cuprous halide.

5. A process as defined in claim 1 wherein from 0.005 to about 0.2 mol percent of the quaternary ammonium salt is employed based on the monovalent phenol.

6. In a process for the preparation of a high molecular weight polyphenylene ether having a degree of polymerization of at least 50 by oxidatively coupling a monovalent phenol having substitution in at least the two ortho positions and hydrogen or halogen in the para-position, using oxygen and a complex catalyst comprising a copper salt and an amine as an oxidizing agent in the presence of a separate aqueous phase, the improvement which comprises including in said complex catalyst from 0.01 to 0.08 mol percent, as based on the monovalent phenol of an ammonium salt or a mixture of ammonium salts of the formula:

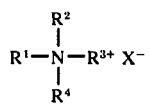

wherein $R^1$, $R^2$, $R^3$ and $R^4$ are selected from the group consisting of alkyl, alkenyl and aralkyl radicals of from 1–24 carbon atoms and $X^-$ is an anion.

7. A process as defined in claim 1 wherein the quaternary ammonium salt is methyl tri-n-octylammonium chloride based on the monovalent phenol.

8. A process as defined in claim 1 wherein said monovalent phenol is 2,6-xylenol.

9. In a process for the preparation of a high molecular weight polyphenylene ether having a degree of polymerization of at least 50 by oxidatively coupling a monovalent phenol having substitution in at least the two ortho positions and hydrogen or halogen in the para position, using an oxygen-containing gas and a complex catalyst comprising a cupric copper salt and a primary or secondary amine as an oxidizing agent in the presence of a separate aqueous phase, the improvement comprising including in said complex catalyst from 0.01 to 0.08 mol percent based on said monovalent phenol of an ammonium salt or a mixture of ammonium salts of the formula:

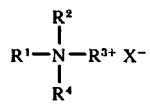

wherein $R^1$, $R^2$, $R^3$ and $R^4$ are selected from the group consisting of alkyl, alkenyl and aralkyl radicals of from 1–24 carbon atoms and $X^-$ is an anion.

10. A process as defined in claim 9 wherein said cupric copper salt is a cupric halide.

11. A process as defind in claim 9 wherein said phenol is 2,6-xylenol.

12. In a process for the preparation of a high molecular weight polyphenylene ether having a degree of polymerization of at least 50 by oxidatively coupling a monovalent phenol having substitution in at least the two ortho positions and hydrogen or halogen in the para-position, using an oxygen-containing gas and a complex catalyst comprising a copper salt and an amine as an oxidizing agent in the presence of a separate aqueous phase, the improvement which comprises including in said complex catalyst an effective amount of a promoter which comprises:

a. an alkali metal bromide or an alkaline earth metal bromide and b. a compound of the formula:

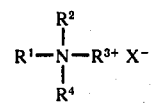

wherein $R^1$, $R^2$, $R^3$ and $R^4$ are selected from the group consisting of alkyl, alkenyl and aralkyl radicals of from 1–24 carbon atoms and $X^-$ is an anion.

13. A process as defined in claim 12 wherein said copper salt is a cupric copper salt.

14. A process as defined in claim 13 wherein said cupric copper salt is cupric sulfate.

15. A process as defined in claim 14 wherein said amine is dibutyl amine.

16. A process as defined in claim 12 wherein component (a) is sodium bromide.

17. A process as defined in claim 12 wherein component (a) is potassium bromide.

18. A process as defined in claim 15 wherein component (b) is methyl tri-n-octylammonium chloride.

19. A process as defined in claim 15 wherein diphenylguanidine is included as a component of the catalyst.

20. In a process for the preparation of a high molecular weight polyphenylene ether having a degree of polymerization of at least 50 by oxidatively coupling a monovalent phenol having substitution in at least the two ortho positions and hydrogen or halogen in the para-position, using oxygen and a complex catalyst comprising a cupric copper catalyst and a secondary amine aas an oxidizing agent in the presence of a separate aqueous phase, the improvement which comprises including in said complex catalyst a promoter which comprises a. an alkali metal bromide and b. a compound of the formula:

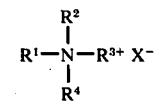

wherein $R^1$, $R^2$, $R^3$ and $R^4$ are alkyl groups of from 1 to 23 carbon atoms and $X^-$ is an anion, said promoter being employed in an amount that is effective to increase the polymerization rate of said monovalent phenol.

21. A process as defined in claim 20 wherein from 0.5 to 25 moles of alkali metal bromide per mole of copper salt is employed.

22. A process as defined in claim 20 wherein from 0.005 to 0.2 mol percent of component (b) is employed.

23. A process as defined in claim 20 wherein component (b) is methyl tri-n-octylammonium chloride.

24. A process as defined in claim 20 wherein said monovalent phenol is 2,6-xylenol.

25. In a process for the preparation of a high molecular weight polyphenylene ether having a degree of polymerization of at least 50 by oxidatively coupling a monovalent phenol having substitution in at least the two ortho positions and hydrogen or halogen in the para-position, using an oxygen-containing gas and a complex catalyst comprising a copper salt and an amine as an oxidizing agent in the presence of an aqueous phase the improvement which comprises including in said complex catalyst from 0.01 to 0.08 mol percent of an ammonium salt or a mixture of ammonium salts of the formula:

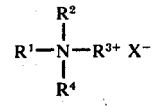

wherein $R^1$, $R^2$, $R^3$ and $R^4$ are selected from the group consisting of alkyl, alkenyl and aralkyl radicals of from 1–24 carbon atoms and $X^-$ is an anion selected from the group consisting of bromine, chlorine, sulfate and phosphate.

* * * * *

UNITED STATES PATENT AND TRADEMARK OFFICE
CERTIFICATE OF CORRECTION

PATENT NO. : 3,988,297
DATED : October 26, 1975
INVENTOR(S) : James G. Bennett, Glenn D. Cooper It is certified that error appears in the above-identified patent and that said Letters Patent are hereby corrected as shown below:

Column 5, line 40: add -- mixture -- after "reaction"

Claim 11, line 1, "defind" should be --defined--

Claim 20, line 7, "aas" should be --as--

Signed and Sealed this

Third Day of May 1977

[SEAL]

Attest:

RUTH C. MASON
*Attesting Officer*

C. MARSHALL DANN
*Commissioner of Patents and Trademarks*